Oct. 10, 1961   P. P. RUPPE   3,003,615
WALKING BEAM CONVEYOR
Filed Feb. 9, 1959   4 Sheets-Sheet 2
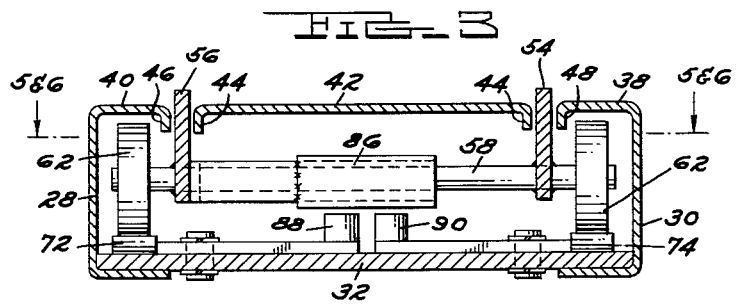
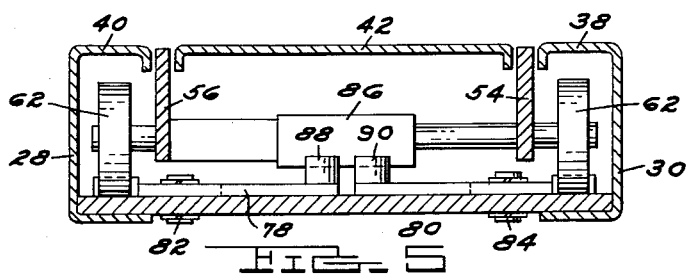
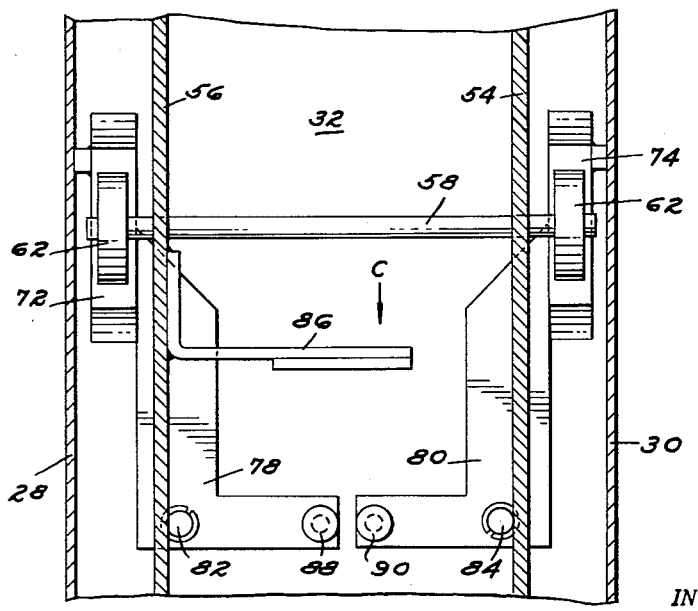
INVENTOR.
PETER P. RUPPE
BY
Burton & Parker
ATTORNEYS Oct. 10, 1961  P. P. RUPPE  3,003,615
WALKING BEAM CONVEYOR
Filed Feb. 9, 1959  4 Sheets-Sheet 3
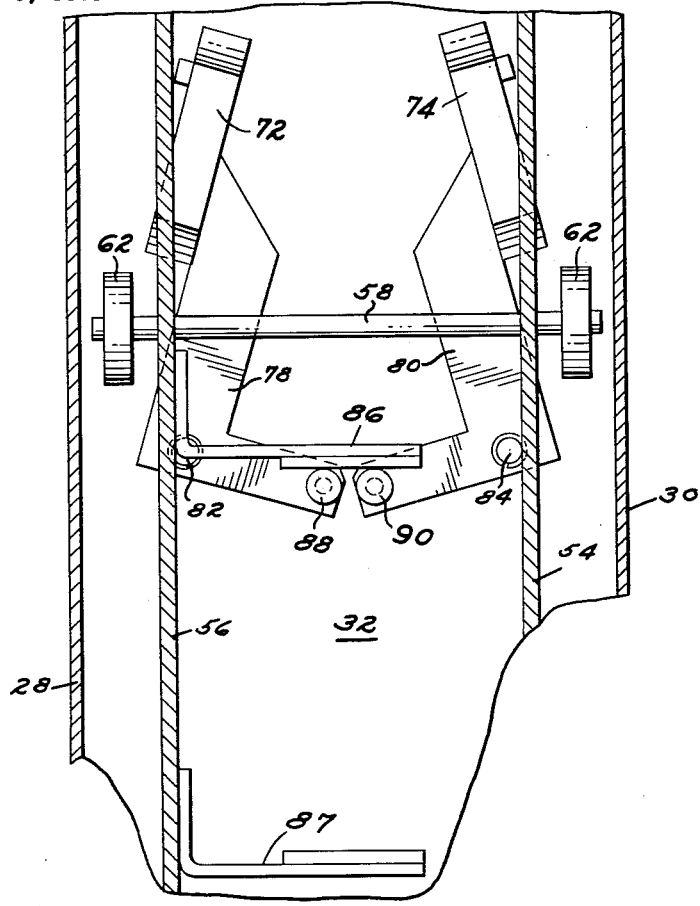
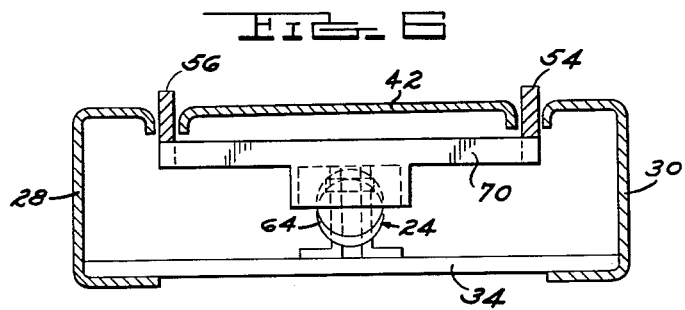
INVENTOR.
PETER P. RUPPE
BY
Burton & Parker
ATTORNEYS

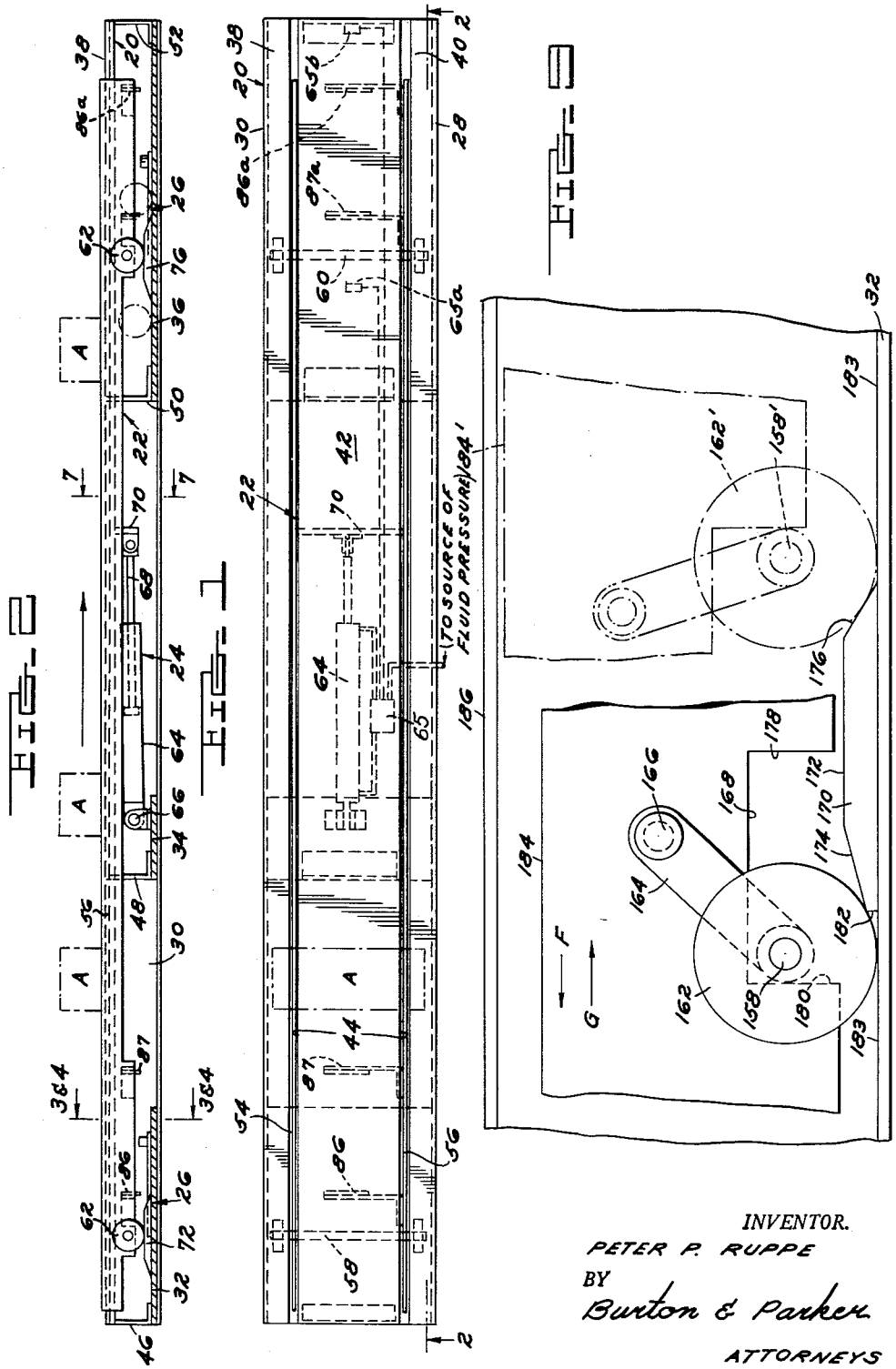

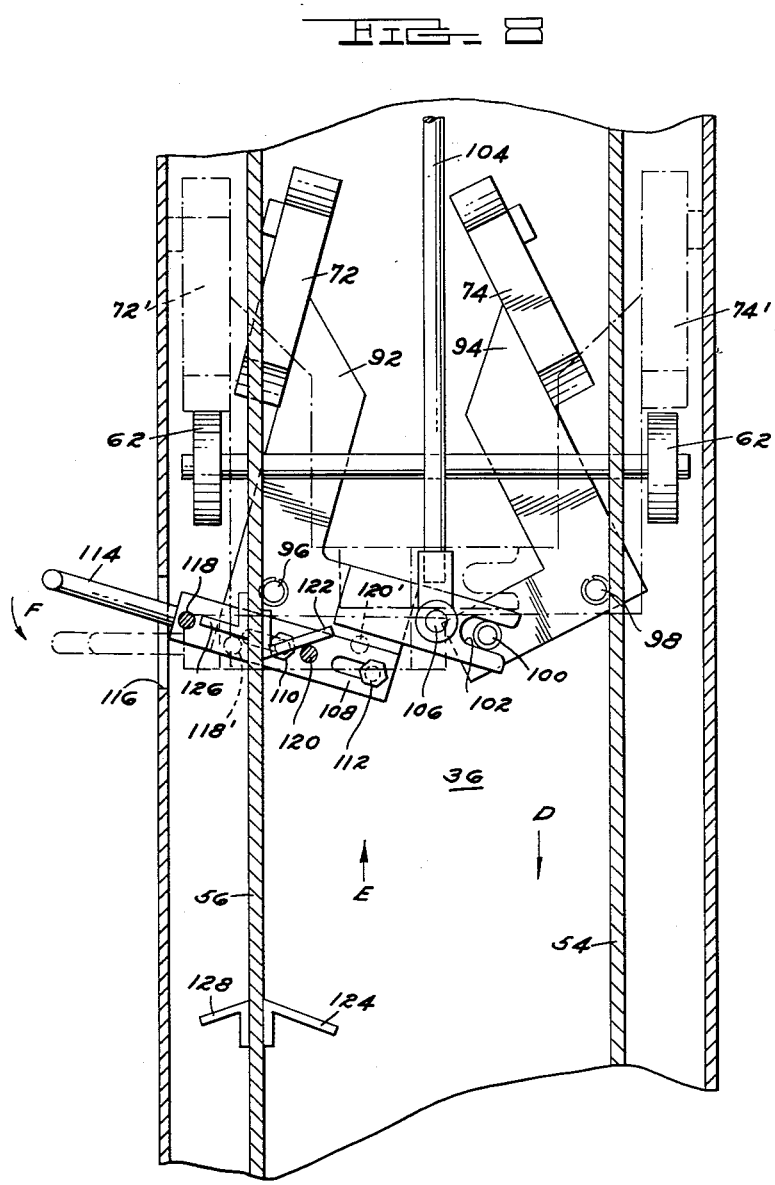

United States Patent Office 3,003,615
Patented Oct. 10, 1961

3,003,615
WALKING BEAM CONVEYOR
Peter P. Ruppe, Grosse Pointe, Mich. (% Prab Conveyors, Inc., 30121 Groesbeck Highway, Roseville, Mich.)
Filed Feb. 9, 1959, Ser. No. 792,034
12 Claims. (Cl. 198—219)

This invention relates to an apparatus for conveying articles.

In general the articles to be conveyed are moved step by step along an article supporting surface, being lifted slightly off the surface during the movement and replaced on the surface during the pauses in the movement. To accomplish this, an article carrier reciprocates longitudinally of the supporting surface, being elevated relative thereto during movement in one direction to lift articles off the surface and shift them longitudinally thereof, and being lowered relative to the supporting surface to replace the articles thereon during movement in the opposite direction.

The apparatus comprising the above-described general arrangement, and as hereinafter disclosed, includes a runway or the like along which the articles to be conveyed are moved, with an article carrier or walking beam so disposed relative to the article supporting surface of the runway that it will move from a position beneath such surface to an elevated position above such surface. Mechanism for reciprocating the beam longitudinally of the runway and for raising and lowering the beam serves to shift the beam, while elevated, in one direction and retract the beam, while lowered, in the opposite direction, with articles resting on the runway being raised therefrom and shifted therealong during the elevated shifting of the walking beam.

The articles are raised off the supporting surface of the runway only sufficiently to clear such surface and prevent dragging of the articles as they are moved along the runway. In the embodiment herein disclosed the elevation of the walking beam is accomplished by cam-like surfaces along and over which the beam is shifted during movement longitudinally of the runway. In one form of the invention the cam surfaces are retracted to an inoperative position upon movement of the beam in one direction to allow longitudinal shifting of the beam in the lowered position, while in another embodiment the cam followers which cooperate with the cam surfaces are effective to raise the beam to an article supporting position as they traverse the cam surfaces during movement of the beam in one direction along the runway but are ineffective to raise the beam to an article supporting position during movement thereof in the opposite direction even though the followers ride over the cam surfaces.

An object of the invention is the provision of apparatus for conveying articles whereby the articles are repeatedly raised from a supporting surface by an article carrier and shifted a short distance along the surface and then replaced on the surface with the article carrier being retracted along the surface below the articles to its starting position and again elevated to repeat the cycle. The cycle is successively repeated to move the articles along the supporting surface in a step-by-step manner.

Another object of the invention is the provision of a relatively inexpensive, simple, and durable conveyor system for moving articles from one location to another.

Another object of the invention is the provision of a conveyor system whose direction of article movement is easily reversed.

Other objects, advantages, and meritorious features will more fully appear from the specification, claims, and accompanying drawing, wherein:

FIG. 1 is a plan view of a conveyor system embodying my invention;

FIG. 2 is a cross sectional view taken on the line 2—2 of FIG. 1;

FIG. 3 is a cross sectional view taken on the line 3—3 of FIG. 2 and showing the article carrier in the elevated position;

FIG. 4 is a cross sectional view taken on the line 3—3 of FIG. 2 and showing the article carrier in the lowered position;

FIG. 5 is a cross sectional view taken on the line 5—5 of FIG. 3 and showing the cams for elevating the article carrier and the mechanism for actuating the cams between operative and inoperative positions, and with the cams in the position to elevate the article carrier;

FIG. 6 is a cross sectional view taken on the line 5—5 of FIG. 3 and showing the mechanism disclosed in FIG. 5 but with the cams shifted to an inoperative position;

FIG. 7 is a cross sectional view taken on the line 7—7 of FIG. 2;

FIG. 8 is a modification of the cam arrangement shown in FIGS. 5 and 6 to allow reversing of the conveyor system so that articles may be conveyed in opposite directions; and FIG. 9 is a modified form of the means for elevating the article carrier and showing cam followers which are operative to elevate the article carrier during its movement in only one direction longitudinally of the article supporting runway.

As shown in FIG. 1 the apparatus embodying the invention includes a pair of cooperating article supports, generally indicated at 20 and 22, having co-adjacent longitudinally extending article-supporting surfaces alternatively operative to support articles thereupon. Mechanism including means 24 is coupled with these supports to shift them longitudinally relative to each other. Such mechanism also includes means 26 adjacent opposite ends of the supports for raising one of the supports relative to the other during longitudinal shifting of the supports in one direction and lowering the raised support during longitudinal shifting in the opposite direction, whereby articles A resting on support 20 are raised therefrom by support 22 and shifted along support 20 and lowered thereupon, with support 22 while lowered being returned to its starting position for repetition of the cycle, with the articles being thereby conveyed along support 20 in a step-by-step fashion. It will be apparent that a longitudinal end-to-end succession of the conveyor mechanism shown in FIGS. 1 and 2 might be provided whereby articles could be conveyed a substantial distance.

More specifically, the support 20 serves as a runway or the like along which the articles to be conveyed are moved in the aforementioned step-by-step fashion. The runway, which may be supported in any convenient manner, not shown, includes a shallow frame (see FIGS. 1–5) having longitudinally extending inwardly opening channel-shaped side frame members 28 and 30 extending the length of the runway and held in spaced parallel relation by floor means in the form of plates 32, 34, and 36 extending transversely therebetween and secured thereto in any suitable rigid fashion. The upper surfaces of floor plates 32 and 36 provide, as hereinafter appears, article carrier-supporting surfaces or trackways supporting the article carrier for movement longitudinally of the runway. The upper flanges 38 and 40 of the side channels serve as article-supporting surfaces for the runway upon which the bottoms of the articles to be conveyed intermittently rest during movement along the runway. To complete the runway and conceal much of the operating mechanism of the conveyor, a wide article-supporting plate 42, whose longitudinal edges 44 are down turned and spaced inwardly from complementary edges 46 and 48 of flanges 38 and 40 to provide slots through which project the hereinafter-described walking beam, extends longitudinally of the frame along the center portion thereof and is supported coplanar with flanges 38 and 40 by angle brackets 46, 48, 50, and 52, as shown in FIGS. 2 and 3. It is now apparent that except for the walking beam slots in the upper surface of the runway, the runway is substantially completely enclosed at the sides and top. As such, it gives a finished appearance and prevents tampering with the mechanism housed therewithin, as well as preventing injury to personnel working adjacent the conveyor. In addition, this unitary construction allows installation of the conveyor as a unit in any desired location without the necessity of providing additional pulleys, shafts, guideways, etc., frequently associated with many other forms of conveyors.

Extending periodically upwardly out of the slots formed between the edges 44 of center plate 42 and the flanges 38 and 40 are the article-lifting and conveying means, specifically the article carriers 54 and 56 which are the article-engaging portions of the walking beam mechanism. These supports are a pair of parallel bars or narrow vertically arranged plates which extend longitudinally throughout substantially the entire length of the runway, terminating short of the ends thereof as shown in FIG. 1. These carriers are disposed within the walking beam slots and are guided for longitudinal movement by the downturned edges 44, 46, and 48, which form the sides of the slots. The upper edges or surfaces of these carriers serve as article-lifting surfaces for articles resting upon the article-supporting surfaces of the runway.

The carriers are supported for reciprocation longitudinally of the runway by roller means. More specifically they are supported upon a pair of fixed axles 58 and 60, as best shown in FIGS. 1, 3, and 5, with wheels 62 rotatably mounted on opposite ends of the axles. These wheels, which may also be considered somewhat as cam followers, roll upon the upper surfaces of the floor plates 32 and 36. To effect the longitudinal shifting of the walking beam as well as its raising and lowering, the means 24 and 26 heretofore mentioned is disposed within the runway enclosure. Means 24 includes, in the illustrative embodiment shown, a fluid presure cylinder 64 pivotally connected as at 66 to the floor plate 34 and provided with a cooperating piston 68 pivotally connected to a bracket 70 extending between and secured to the supports 54 and 56 of the walking beam. By alternate pressurization of opposite ends of cylinder 64, such as by an electrically operated fluid pressure valve 65, under the control of limit switches 65a and 65b actuated by fingers 87a and 86a similar to fingers 86 and 87 hereinafter mentioned, the valve being connected to a source of fluid pressure, the piston 68 will cause the walking beam to reciprocate longitudinally of the runway.

As the walking beam reciprocates, means 26 serve to raise and lower it relative to the article-supporting surface of the runway between the position shown in FIG. 4 wherein the upper surfaces of suports 56 and 58 are below the article-supporting surfaces of the runway, and the position shown in FIG. 3 where the supports are elevated above the runway to lift an article therefrom for movement along the runway spaced thereabove, serves, in effect, to raise and lower the effective height of the upper surfaces of floor plates 32 and 36, or in other words, the effective height of the article carrier-supporting surface over which the carrier passes during its reciprocation longitudinally of the runway. Means 26 includes four cams, one for each wheel 62. Three of the cams are shown in FIGS. 2–5 at 72, 74, and 76. The cams are laterally slidable on their respective floor plates 32 and 36 from operative positions in which the wheel 62 will roll over them to raise and lower the walking beam, to inoperative positions out of the paths of the wheels.

To effect shifting of the cams, each is carried by an actuating arm, with the arms arranged in pairs for simultaneous actuation. A description of the cams 72 and 74, their actuating arms, and other mechanism for operating them at the left-hand end of the conveyor as shown in FIG. 2, will suffice for the pair of cams, their actuating arms, and other mechanism for operating them at the right-hand end of the conveyor, as both pairs are of similar construction and operation. Referring to FIGS. 4 and 5, it will be noted cams 72 and 74 are secured, in any convenient fashion, to L-shaped arms 78 and 80, each of which is pivotally mounted respectively at 82 and 84 upon the floor plate 32. Because the cams must be operative to raise the walking beam during its movement in one direction and allow it to move in the opposite direction without raising it, the shifting of the cams must be synchronized with the reciprocation of the beam. To effect this synchronized movement, alternately operative cam shift fingers 86 and 87 are secured, in any convenient fashion, at longitudinally spaced apart positions along and to one of the article supports 56 to strike the finger engaging rollers 88 and 90 upstanding respectively from arms 78 and 80 to pivot the arms between the positions shown in FIGS. 5 and 6. In the latter figure the cams 72 and 74 are in their inoperative positions.

With the walking beam moving in the direction of arrow C in FIG. 5, the wheels 62 are passing over cams 72 and 74 and the walking beam is in the elevated position. It will be apparent that the walking beam is held in the elevated position throughout the length of the high point of the cams. The cams, as shown in FIG. 2, are shaped to have upper surfaces which extend lengthwise of the direction of movement of the walking beam with such upper surfaces having a flat portion across which the wheels 62 will roll and it is during the travel of the wheels across such flat elevated surfaces of the cams that the conveying of articles A is effected. The length of the flat elevated surface of the cams need not be great because, by continued reciprocation of the walking beam, the articles will be moved in a uniform step-by-step movement along the runway, and the length of the elevated flat portion of the cams will simply determine the distance the articles are moved between the pauses in the step-by-step movement. As wheels 62 ride down off the cams and return to the floor plate 32, see FIG. 5, finger 86 strikes pin rollers 88 and 90 to swing cams 72 and 74 inwardly to the FIG. 6 position. At this instant the fluid pressure to cylinder 64 is redirected to enter the opposite end of the cylinder and the longitudinal movement of the walking beam is reversed. Because the cams 72 and 74 have been retracted from the path of the wheels 62, the walking beam retracts without elevation. As piston 68 nears the inward end of its stroke and the wheels 62 have passed beyond cams 72 and 74, cam actuating finger 87 strikes the pin rollers 88 and 90 shifting the cams laterally outwardly back into the path of the wheels. Cylinder 64 at this time is again reversely pressurized and the walking beam reverses the longitudinal movement. Wheels 62 ride up the cams 72 and 74 elevating the walking beam to lift articles resting on the runway and to come therealong and again set them on the runway as the wheels run down off the cams. This cyclic movement repeats itself in rhythmic fashion to move the articles A along the runway in a step-by-step manner.

As thus far described, the conveyor will move articles in only one direction along the runway. However, in a modified form of the cam mechanism shown in FIG. 8, the conveyor may be easily adjusted to reverse the movement of articles thereon. As with the previously described embodiment, two pairs of cams are provided with the cams mounted on pivoted pairs of arms, one pair being shown at 92 and 94 in FIG. 8 with it being understood that the cam mechanism at the other end of the walking beam is of identical construction except as hereinafter mentioned. Arms 92 and 94 are pivoted upon the floor plate 36 at 96 and 98. A pin roller 100 on arm 94 cooperates with a slot 102 in the companion arm so that the arms will shift synchronously. An actuating rod 104 pivotally connected as at 106 to arm 92 extends longitudinally of the runway just beneath the center plate 42 and is pivotally connected at its opposite end to an arm, of the other pair of arms, corresponding to arm 92. As thus far described, the cam mechanism coupled to opposite ends of rod 104 are identical and upon actuation of the cam arms 92 and 94, the rod 104 will cause corresponding movement of the other pair of arms at the opposite end of the runway.

Arm 92 is provided with a slidable reversing plate 108 having slots therein through which bolts 110 and 112 slidably connect the plate to the arm. A handle 114 is rigidly connected to the plate and projects outwardly through the side of the runway through a slot 116. Upstanding from the reversing plate are two arm shifting pins 118 and 120. Secured in any convenient fashion at longitudinally spaced-apart points to opposite sides of the carrier 56 are two pairs of cooperating cam arm actuating fingers, one pair being indicated at 122 and 124, and the other pair at 126 and 128. Fingers 122 and 124 cooperate with arm shifting pin 120 to effect actuation of cam arms 92 and 94 so that articles are conveyed along the runway in the direction of arrow D while fingers 126 and 128 cooperate with pin 118 to cause the walking beam to move articles along the runway in the direction of arrow E.

The operation of the FIG. 8 modification may be visualized from consideration of, first, the solid outline position of the arms 92 and 94, and thereafter a consideration of the phantom outline of the arms. In the solid outline the reversing plate 108 is shown in its slidable position on the arm 92 so that articles will be shifted in the direction of arrow D. The finger 122 has just struck pin 120 with the supports 56 and 54 moving in the direction of arrow D to swing the cams 72 and 74 inwardly and out of the path of the wheels 62. Reverse movement of carriers 54 and 56 will now occur without elevation thereof. Once the wheels 62 have passed beyond the ends of cams 72 and 74, actuating finger 124 will strike pin 120 to swing the arms 92 and 94 outwardly to position the cams in the path of the wheels 62. Thereafter, upon movement of the carriers 54 and 56 in the direction of arrow D, the carriers will be elevated and the articles will be moved along the runway in the direction of arrow D.

To reverse the movement of the articles on the conveyor, and assuming that the carriers are in the positions shown in FIG. 8, the operator grasps handle 114 and through a combined swinging and pushing of handle 114 in the direction of and corresponding to the shape of arrow F, he swings the arms 92 and 94 radially outwardly to the phantom outline position shown. During this swinging movement and inward pushing of handle 114, the reversing plate 108 is shifted inwardly so that the pins 118 and 120 assume the phantom outline positions indicated at 118[1] and 120[1]. It will be noted that the phantom outline position of pin 120 is disposed inwardly and out of the path of movement of actuating fingers 122 and 124, while pin 118 in its phantom outline position 118[1] is in the path of movement of fingers 126 and 128.

Assuming that the supports now move in the direction of arrow E, wheels 62 will ride up over cams 72 and 74 shown in phantom outline at 72[1] and 74[1] to elevate the supports and shift the articles in the direction of arrow E. Near the end of the stroke of the supports, finger 128 will engage pin 118 in its phantom position 118[1] to swing arms 92 and 94 inwardly and through rod 104 to cause corresponding movement of the cam arms at the opposite end of the walking beam. Thereupon reverse movement of the supports in the direction of arrow D will allow the supports to return to the positions shown in FIG. 8 without elevation and when finger 126 strikes pin 118 in its phantom outline position, the arms 92 and 94 will be swung to the phantom outline position to dispose cams 72 and 74 at the position 72[1] and 74[1]. It is now apparent that articles will be moved along the runway in the direction of arrow E.

Shown in FIG. 9 is a further modification of the invention. This modification overcomes the necessity of laterally shifting the cams out of the path of the wheels 62 in order to prevent elevation of the walking beam during movement in one direction. In this modification the wheels 62, heretofore mentioned in connection with FIGS. 1–8, instead of being mounted in fixed relation with supports 54 and 56, are connected thereto by swinging links. The wheels are indicated in two different positions, a low-level position at 162 and a high-level position at 162[1] in FIG. 9. They are mounted in pairs as heretofore described at opposite ends of axles, one of the axles being shown in FIG. 9 at 158. The axles are connected to the carriers 54 and 56 by pairs of swinging links, one of which is shown at 164, being pivotally connected to the supports as at 166. The supports are provided with cutouts in the form of rectangular notches 168 and the axle 158 is capable of swinging about its pivotal connection 166 between the position shown in solid outline at the left in FIG. 9 and the position shown in phantom outline. The elevating cam 170 over which the wheel 162 rides is provided with the flat upper surface 172 corresponding to the flat surface heretofore mentioned in connection with cams 72 and 76. However, cam 170 has different angles of approach at opposite ends. The approach angle at the left and indicated at 174 is not as steep as the approach angle at the opposite end indicated at 176. These different approach angles at opposite ends of the cam together with the pivotal connection 166, being disposed more closely adjacent the end 178 of notch 176 than it is relative to the end 180 of the notch, serve to cause swinging of the wheel axis 158 between the solid and phantom positions.

The cams 170 serve in effect to provide the carrier-supporting surfaces of the floor plates 32 and 36 with a high-level portion 172 and a low-level portion 183. The notches 168 serve as means limiting the pivotal swinging movement of the wheel links 164.

Assuming that the walking beam has finished its movement in the direction of arrow F of FIG. 9, and starts its movement in the direction of arrow G, the wheel 162 will engage the step 182 at the end of cam 170 and the resistance to rolling movement offered by the step will cause the link 164 to swing from the phantom position shown in FIG. 9 to the solid position. As the movement of the walking beam continues in the direction of arrow G, wheel 162 will ride up over the cam 170 and down the inclined surface 176. During such movement the upper surface 184 of the walking beam will be disposed below the article-supporting surface 186 of the runway. However, upon movement of the walking beam in the direction of arrow F, the resistance offered wheel 162 by the steep slope 176 of the cam will cause the axle 158 to swing from the solid outline position to the phantom outline position indicated at 158[1]. The walking beam will now be disposed with its supporting surface 184[1] disposed beneath the article-supporting surface 186 of the runway but at a higher elevation than it was in the solid outline position. Continued movement of the walking beam in the direction of arrow F will cause the wheel to ride up the inclined surface 176 of the cam and onto the flat 172 at which time the surface 184 will be disposed above the article-supporting surface 186 of the runway and articles on the runway will be lifted therefrom and moved therealong until the wheel 162 rides down the slops 174. Movement of the walking beam in the direction of arrow G will, as heretofore mentioned, cause the axle to swing from the phantom outline position to that of the solid outline position lowering the walking beam so that its return movement will be ineffective to move the articles on the runway.

What I claim is:

1. An article conveyor comprising, in combination: an article support having an article-supporting surface over which articles to be conveyed are moved; mechanism for shifting articles along said support including an article carrier reciprocable longitudinally of said support in the direction of article movement and having an article-lifting surface disposed beneath articles to be moved along the support; means providing an article carrier-supporting surface extending in the direction of carrier movement and upon which the carrier is supported for reciprocation; said carrier-supporting surface so disposed relative to the article-supporting surface of said support that the article-lifting surface of the carrier is disposed beneath the article-supporting surface of said support; cam means shiftable relative to the first-mentioned means between a position in the path of carrier movement to elevate the carrier and dispose its article-lifting surface above the article-supporting surface of said support, and a position retracted from the path of the carrier; and actuating means coupled with said cam means and with said mechanism and operative to synchronize functioning to shift said cam means to a position in the return path of the carrier at the end of one stroke thereof and retract the cam means from the path of the carrier at the end of such return stroke.

2. The invention as defined in claim 1 characterized in that the first-mentioned means is defined by a portion of said support disposed spaced below the article-supporting surface of said support and extending longitudinally thereof.

3. An article conveyor comprising, in combination: an article support having a longitudinally extending article-supporting surface providing a runway along which articles to be conveyed are moved; an elongate article carrier extending longitudinally of said runway; means providing a carrier-supporting surface for supporting said carrier for reciprocable movement longitudinally of the runway with the upper surface of the carrier disposed below the runway; cam means supported for shiftable movement laterally over said carrier-supporting surface between positions in the path of carrier movement and out of the path of carrier movement, said cam means when in the path of carrier movement operative to elevate the carrier as it rides thereover to dispose the upper surface of the carrier above the runway raising articles therefrom for movement with the carrier; operating linkage coupled to said cam means and operatively coupled with the carrier to be actuated at each end of each stroke of carrier reciprocation longitudinally of the runway to shift the cam means from one of said positions to the other; and drive means coupled to the carrier for reciprocating it.

4. The invention as defined in claim 3 characterized in that said actuating linkage includes a portion engageable by the carrier as the carrier reaches each end of its stroke and which portion serves to actuate said linkage in first one direction and then the opposite direction, and said portion being mounted on the linkage for shiftable movement relative thereto between two positions causing actuation of the linkage respectively in one direction or the other at the same end of the carrier stroke to provide reversal of article movement by the conveyor.

5. An article conveyor comprising, in combination: an elongate flat article-supporting surface extending in the direction of intended article movement; a pair of article carriers, one at each side of said surface, with each carrier having an elongate article-lifting surface extending along the length of said article-supporting surface; means coupled to said carriers to reciprocate them longitudinally of the supporting surface; means providing carrier-supporting surfaces upon which the carriers are supported for said reciprocating movement; cam means shiftable across the carrier-supporting surface between positions elevating the carriers as they engage and ride over the cam means to dispose said article-lifting surfaces of the carriers above said article-supporting surface, and positions out of the path of carrier movement to allow carrier movement longitudinally of said supporting surface with the article-lifting surfaces of the carriers disposed below said article-supporting surface; and means coupled to said cam means and cooperable with the carriers to synchronize shifting of the cam means with the reciprocation of the carriers.

6. An article conveyor comprising, in combination: a pair of elongate flat article-supporting surfaces extending in the direction of intended article movement; a pair of article carriers, one adjacent each of said surfaces and each having an article-lifting surface extending in the direction of the length of said supporting surfaces; means coupled to said carriage to reciprocate them longitudinally of the supporting surfaces; means providing longitudinally extending carrier-supporting surfaces upon which the carriers are supported for said reciprocating movement; cam means shiftable across the carrier-supporting surfaces between positions elevating the carriers as they engage and ride over the cam means to dispose the article-lifting surfaces thereof above said article-supporting surfaces, and positions out of the path of carrier movement to allow carrier movement longitudinally of said supporting surfaces with the article-lifting surfaces disposed below said article-supporting surfaces; and means coupled to said cam means and cooperable with the carriers to synchronize shifting of the cam means with the reciprocation of the carriers.

7. An article conveyor comprising, in combination: a pair of parallel elongate channel-shaped members each having an upper flange with the members spaced apart along their lengths and said flanges disposed in horizontal coplanar relation and providing a pair of article-supporting surfaces along which articles to be conveyed are moved; floor means extending between and secured to said members adjacent opposite ends thereof and disposed spaced below said article-supporting surfaces; article-lifting and conveying means having an article-lifting surface disposed between and extending longitudinally of said members and normally disposed below said article-supporting surfaces; mechanism coupled with said article-lifting and conveying means to reciprocate the same longitudinally of said members; a plurality of roller means secured to the lifting and conveying means and supporting the same for movement across said floor means; a plurality of cams, one for each roller means, slidable across said floor means into and out of the path of the roller means during reciprocation of the article-lifting and conveying means, an arm for each cam shiftably mounted on the floor means and secured to its respective cam to shift the cam as aforesaid; actuating means carried by said lifting and conveying means and cooperable with said arms at one end of each stroke of the lifting and conveying means to shift the cams into the path of the roller means for the ensuing reverse stroke and cooperable with the arms at the opposite end of each stroke of the lifting and conveying means to shift the cams out of the path of the roller means for the ensuing reverse stroke.

8. The invention as defined in claim 7 characterized in that said lifting and conveying means includes a pair of elongate article carriers disposed in parallel spaced-apart relation between said members and having flat horizontal coplanar article-lifting surfaces, and a cover plate is disposed between the carriers and extends along the length of said members coplanar with the flanges of said members and secured in fixed relation relative thereto and covering and concealing the cams and roller means and floor means therebeneath.

9. The invention as defined in claim 7 characterized in that said actuating means includes two sets of actuating fingers for said arms, and said arms include a part selectively shiftable between positions to engage one or the other of said sets of actuating fingers, one set of said fingers operable to shift the arms in one direction at the end of each stroke of the conveying and lifting means and the other set operable to shift the arms in the opposite direction at the end of each stroke whereby the direction of article movement by the conveyor may be reversed.

10. A step-by-step article conveyor comprising, in combination: a generally planar article-supporting surface along which articles are to be conveyed, mechanism for shifting articles along said surface including an article carrier reciprocable along said supporting surface beneath articles resting upon such surface; a first carrier-supporting surface upon which the carrier rides during reciprocation in one direction and so disposed relative to the article-supporting surface that the carrier is in a non-carrying position beneath articles on the article-supporting surface; a second carrier-supporting surface upon which the carrier rides during reciprocation in the opposite direction and which is disposed above the first carrier-supporting surface such that the carrier is in an article-carrying position above the article-supporting surface; and means coupled with one of said carrier-supporting surfaces and cooperable with said mechanism to shift such surface into and out of the path of carrier reciprocation at the completion of successive strokes of reciprocatory travel of the carrier.

11. A step-by-step article conveyor comprising, in combination: an elongate runway surface along which articles are to be conveyed; an article carrier; means supporting said carrier beneath articles resting upon said runway for reciprocation in the direction of intended article movement along the runway; a first carrier-supporting surface cooperable with said means during reciprocation of the carrier in one direction and so disposed relative to the runway surface that the carrier is supported in a non-carrying position beneath articles resting on the runway; a second carrier-supporting surface cooperable with said means during reciprocation of the carrier in the opposite direction and vertically displaced from the first carrier-supporting surface and so disposed relative to the article runway that the carrier is supported in an article-carrying position above the runway; and mechanism coupled with one of said carrier-supporting surfaces and responsive to reciprocation of the carrier to shift such surface to a position cooperable with said means prior to reciprocatory movement of the carrier in one direction and shift such surface out of a position cooperable with said means prior to reciprocatory movement of the carrier in the opposite direction.

12. The invention as defined in claim 11 characterized in that said mechanism includes a part shiftable independently of the carrier to reverse operation of such mechanism whereby the said one carrier-supporting surface is shifted out of a position cooperable with said means prior to reciprocation of the carrier in said one direction and is shifted to a position cooperable with said means prior to reciprocation of the carrier in said opposite direction.

References Cited in the file of this patent
UNITED STATES PATENTS

| | | |
|---|---|---|
| 2,400,763 | Malo | May 21, 1946 |
| 2,622,401 | Drago | Dec. 23, 1952 |
| 2,940,490 | Himmelheber | June 14, 1960 |